United States Patent [19]

Haga et al.

[11] Patent Number: 4,460,016

[45] Date of Patent: Jul. 17, 1984

[54] ROTARY SERVOVALVE

[75] Inventors: Kyosuke Haga, Anjo; Tsuneo Tanaka, Okazaki, both of Japan

[73] Assignee: Toyoda Koki Kabushiki Kaisha, Kariya, Japan

[21] Appl. No.: 359,860

[22] Filed: Mar. 19, 1982

Related U.S. Application Data

[63] Continuation-in-part of Ser. No. 268,380, May 29, 1981.

[30] Foreign Application Priority Data

May 30, 1980 [JP] Japan .................................. 55-73607
Mar. 27, 1981 [JP] Japan .................................. 56-45826

[51] Int. Cl.³ .............................................. F15B 13/16
[52] U.S. Cl. ............................. 137/625.24; 91/375 R; 91/375 A
[58] Field of Search ............... 137/625.21, 625.22, 137/625.23, 625.24, 625.69; 91/375 A, 375 R

[56] References Cited

U.S. PATENT DOCUMENTS

| 3,556,155 | 1/1971 | Morris | 137/625.69 |
| 3,591,136 | 7/1971 | Bishop | 251/209 |
| 3,772,962 | 11/1973 | Suzuki | 91/375 A |

Primary Examiner—Alan Cohan
Attorney, Agent, or Firm—Oblon, Fisher, Spivak, McClelland & Maier

[57] ABSTRACT

A rotary servovalve for a power steering system is provided wherein a plurality of orifices are established by a plurality of axial extending lands formed on the internal surface of a valve sleeve and the circumferential surface of a rotor received therein. As the rotor rotates relative to the sleeves, the orifices control the pressure and the flow of fluid supplied from a pump to a power cylinder of the steering system and from the power cylinder to a reservoir. Each of the lands on the rotor is formed at each of its circumferential edges with a chamfer which has a third slope for preventing the generation of cavitation and hissing noise, in addition to first and second slopes for offering an optimum steering feeling to a vehicular driver.

7 Claims, 8 Drawing Figures

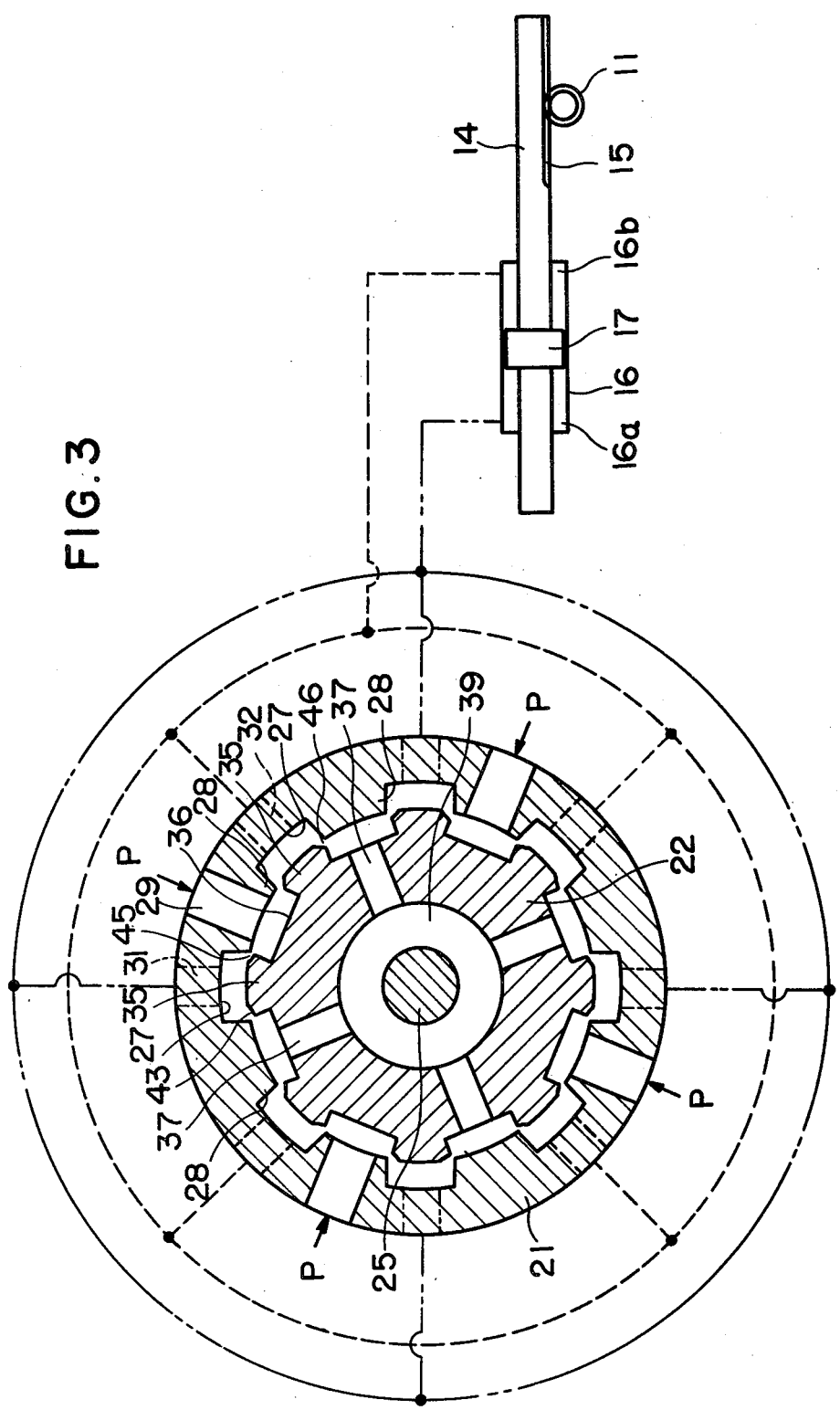

ROTARY SERVOVALVE

BACKGROUND OF THE INVENTION

1. Field of the Invention

The present application is a Continuation-In-Part of U.S. Patent Application No. 268,380 filed on May 29, 1981.

The present invention relates to a rotary servovalve of the type in which the relative rotation between a valve sleeve and a rotor received therein is utilized to distribute fluid supplied from a pump to an actuator while increasing the pressure of fluid so distributed. More particularly, it relates to such a rotary servovalve, preferable for use in a power steering system.

2. Description of the Prior Art

In a conventional rotary servovalve for a power steering system as shown in FIGS. 1(a) and 1(b), there is provided a valve sleeve 1 in which a rotor 2 is rotatably received. The valve sleeve 1 is formed with supply ports 5 and distribution ports 6A, 6B therein and several axially extending lands on the inner periphery thereof. The rotor 2 is formed with several axially extending lands 3 and 4 alternatively on the outer periphery thereof, wherein the lands 3, provided with exhaust ports 8A and 8B, and the lands 4 cooperate with the lands of the valve sleeve 1 for controlling fluid distribution and fluid pressure to a power cylinder, respectively.

In such a conventional rotary valve, when the rotor 2 is in a neutral position as shown in FIG. 1(a), pressurized fluid supplied from a pump through the supply ports 5 is equally divided and discharged to a reservoir through the exhaust ports 8A and 8B, but when the rotor 2 is rotated, for example, in a counterclockwise direction as shown in FIG. 1(b), the lands 3 are moved to shut off the fluid communication between the supply ports 5 and the exhaust port 8A to thereby increase fluid pressure applied to the cylinder in accordance with the rotational angle $\Delta\theta$ relative to the valve sleeve 1. As a result, pressurized fluid is discharged to the exhaust port 8B only through an orifice 7 formed between the land 4 and the valve sleeve 1. Accordingly, the fluid volume passing through the orifice 7 is increased in proportion to the rotation of the rotor 2 relative to the valve sleeve 1. This increase causes the generation of cavitation and unpleasant noise, such as hissing noise.

SUMMARY OF THE INVENTION

Accordingly, it is a primary object of the present invention to provide an improved rotary servovalve for a power steering system which, by providing chamfers of an improved configuration at circumferential edges of axially extending lands formed on a valve sleeve or a rotor, is capable of preventing the generation of cavitation and hissing noise, and of providing an optimum orifice area curve, thereby offering the "feel" required for truly optimum steering to a vehicle driver.

Another object of the present invention is to provide an improved rotary servovalve for a power steering system in which the generation of cavitation and hissing noise can be prevented by discharging fluid to a reservoir through several orifices so as to reduce the flow volume passing through each one of the orifices.

Briefly, according to the present invention, there is provided a rotary servovalve for a power steering system which includes a valve sleeve formed with a plurality of first axially extending lands on its internal surface and a rotor rotatably received in the valve sleeve and formed with a plurality of second axially extending lands on its circumferential surface. The first axially extending lands cooperate with the second axially extending lands to establish a plurality of orifices which control the pressure and the flow of fluid from one of first and second port to a third port, and from there to the other of the first and second ports. The axially extending lands on the valve sleeve or the rotor are formed with a plurality of chamfers at their circumferential edges. Each of the chamfers includes first and second slopes having different angles with respect to the circumferential direction of each of the axially extending lands. Each of the chamfers further includes a third slope having a more gentle angle than those of the first and second slopes for smoothly connecting the second slope between the first and third slopes with a circumferential circular surface of each of the axially extending lands.

Since the first and second slopes are provided on each of the chamfers, the curve defined by the change of the opening area at each of the orifices as the rotor rotates relative to the valve sleeve has three slopes to provide a two-step valving characteristic, which offers the "feel" required for truly optimum steering to a vehicle driver. Further, the provision of the third slope on each of the chamfers causes pressurized fluid to smoothly flow along the third slope without separating therefrom, thereby preventing the generation of cavitation and hissing noise.

In another aspect of the present invention, the first and second axially extending lands are made identical with one another in shape and size. This causes fluid introduced from one supply port to be discharged through two orifices, thereby reducing the flow volume passing through each one of the orifices so that the generation of cavitation and hissing noise can be prevented.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 3 is an enlarged cross-sectional view of the rotary servovalve shown in FIG. 2;

DETAILED DESCRIPTION OF THE PREFERRED EMBODIMENT

Figure 1A:
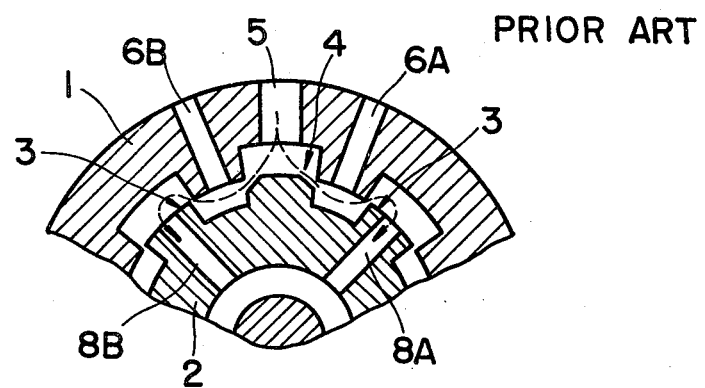
FIG. 1(a) is a cross-sectional view of a conventional rotary servovalve with a rotor being in a neutral position relative to a valve sleeve.
Figure 1B:
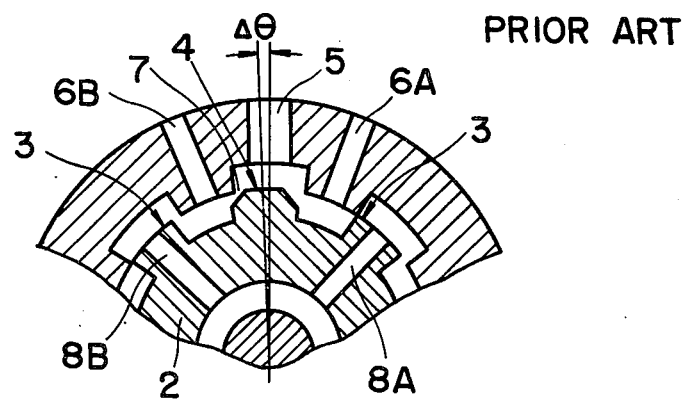
FIG. 1(b) is a cross-sectional view of the conventional rotary servovalve illustrated in FIG. 1(a) with the rotor turned slightly relative to the valve sleeve.
Figure 2:
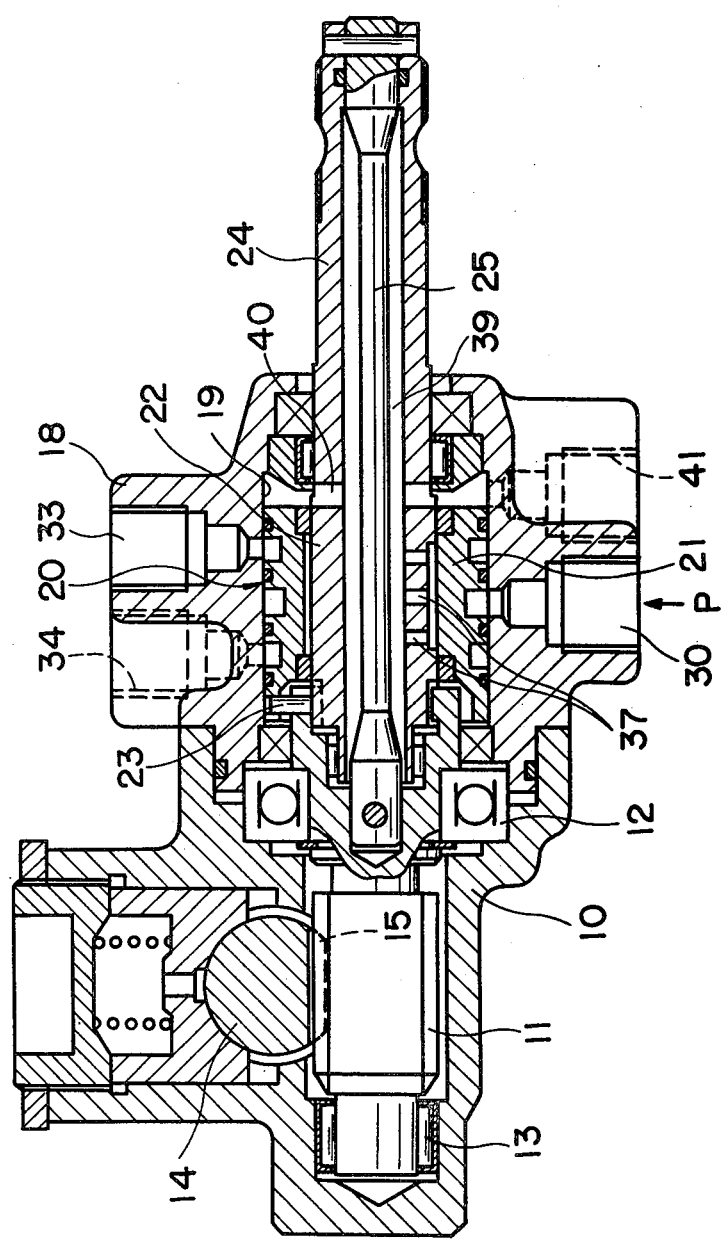
FIG. 2 is a sectional view of a power steering system utilizing a rotary servovalve according to the present invention.

Referring now to FIG. 2, a rotary servovalve according to the present invention is shown applied to a power steering system of a rack and pinion type. A numeral 10 denotes a gear housing as a main body of the power steering system, in which a pinion shaft 11 is rotatably supported with its opposite ends being received through a pair of bearings 12 and 13. The shaft 11 is meshed at its pinion portion with a rack 15 of a rack shaft 14. Opposite ends of the rack shaft 14 are connected with vehicular steerable wheels through suitable steering link mechanisms, as is well known in the art. Further, the rack shaft 14 is operably connected with a piston 17 of a power cylinder 16, as schematically illustrated in FIG. 3.

Secured to the gear housing 10 is a valve housing 18 provided with a valve chamber 19 in which the rotary servovalve 20 according to the present invention is rotatably received. The rotary servovalve 20 comprises a valve sleeve 21 and a rotor 22 received therein, which are rotatable with respect to each other about the axis of the pinion shaft 11. The valve sleeve 21 is connected to the pinion shaft 11 through a connecting pin 23 for bodily rotation therewith. The rotor 22 is formed with the steering rod 24 connectable to a steering wheel (not shown), and the steering rod 24 is elastically connected to the pinion shaft 11 through a torsion bar 25, so that the rotor 22 is rotatable relative to the sleeve 21 within a limited angular extent.

Referring now to FIG. 3, a plurality (eight in the illustrated embodiment) of axially extending slots 27 are formed on the internal surface of the valve sleeve 21 at regular intervals, thus providing one land 28 between every two of the slots 27. A supply port P opens at 29 on every second land 28 and communicates with a pump port 30, which in turn communicates with a hydraulic pump, not shown. For the purpose of further explanation only, each of the lands 28 on which the supply ports 29 open will be referred to as a first sleeve land, and each of the remaining lands 28 as a second sleeve land. A pair of distribution ports 31 and 32 respectively open on the bottoms of alternating slots 27 and respectively communicate with cylinder ports 33 and 34, which are, in turn, respectively in fluid communication with left and right chambers 16a and 16b of the power cylinder 16.

Similarly, the circumferential surface of the rotor 22 is also formed at regular intervals with a plurality of lands 35 which respectively angularly correspond to the slots 27 on the valve sleeve 21, thus providing a plurality of axially extending slots 36 which respectively angularly correspond to the lands 28 on the valve sleeve 22. Exhaust ports 37 open on every second rotor slot 36 at positions which angularly correspond to the second sleeve lands 28. Thus, each of the exhaust ports 37 is angularly disposed between sets of two distribution ports 31 and 32 which are adjacent to each other but serve different supply ports 29. These exhaust ports 37 are in fluid communication with a reservoir, not shown, through a passage way 39 defined between the rotor 22 and the torsion bar 25 extending therethrough, through a through hole 40 and through a reservoir port 41. Several other groups of exhaust ports each having the same configuration as the aforementioned group of exhaust ports 37 are further provided in the rotor 22 in different axial planes. This advantageously makes it possible to secure a required area for fluid flow without increasing the diameter of the rotor 22.

Each of the lands 35 on the rotor 22 is formed with chamfers 43 at opposite edges thereof in the circumferential direction of the rotor 22. All of the lands 35 on the rotor 22 are formed identical with one another in shape and size. Likewise, all of the lands 28 on the valve sleeve 21 are formed identical with one another in shape and size and respectively correspond to the slots 36 on the rotor 22 in overlapped relation therewith. It is accordingly understood that the corresponding respective relationships of the lands 28 on the valve sleeve 21 to the lands 35 on the rotors 22 are identical with one another at any circumferential angular position.

When steering torque in a clockwise direction, as viewed in FIG. 3, is exerted on the steering rod 24, the torsion bar 25 is twisted to permit the rotation of the rotor 22 relative to the valve sleeve 21. This causes the opening area between each supply port 29 and one of the associated distribution ports 32 to increase while causing the opening area between each supply port 29 and the other of the associated distribution ports 31 to decrease, so as to establish a suction orifice 45 therebetween. The rotation of the rotor 22 relative to the valve sleeve 21 further causes an increase in the opening area between each distribution port 31 and its associated exhaust port 37 while causing a decrease in the opening area between each distribution port 32 and its associated exhaust port 37, to thereby establish an exhaust orifice 46 therebetween. Since all of the lands 28 on the valve sleeve 21 are identical with one another in shape, as are all of the lands 35 on the rotor 22, the opening areas at the suction and exhaust orifices 45 and 46 are identical with each other, such relation being maintained at any angular position which the rotor 22 takes.

Consequently, the major part of the pressurized fluid supplied from the supply ports 29 into the exhaust ports 37 is equally divided by the orifices 45 and 46. Moreover, upon the application of torque to the steering rod 24, the pressure of fluid within the supply ports 29 and the distribution ports 32 is increased due to the increased resistance at the orifices 45 and 46, whereby the power cylinder is operated.

As is apparent from the above, the orifices 45 and 46 act to divide in half the flow of fluid under pressure which returns to the reservoir. This results in reducing the flow volume that passes through each of the orifices 45 and 46 and therefore, is advantageous in restraining the generation of cavitation.

Figure 4:
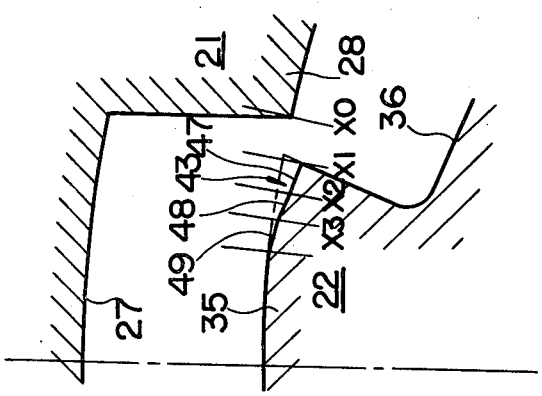
FIG. 4 is an enlarged sectional view of a part of FIG. 3.
Figure 7:
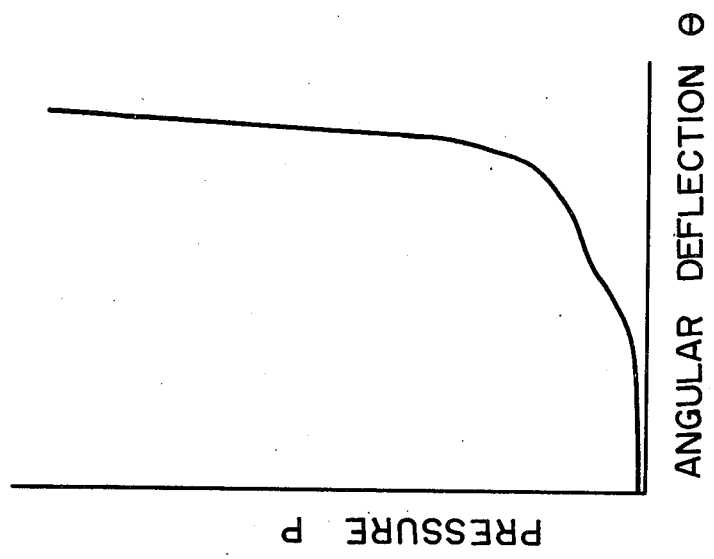
FIG. 7 is a graph showing the relation between the angular deflection of the rotor relative to the valve sleeve and the pressure.
Figure 6:
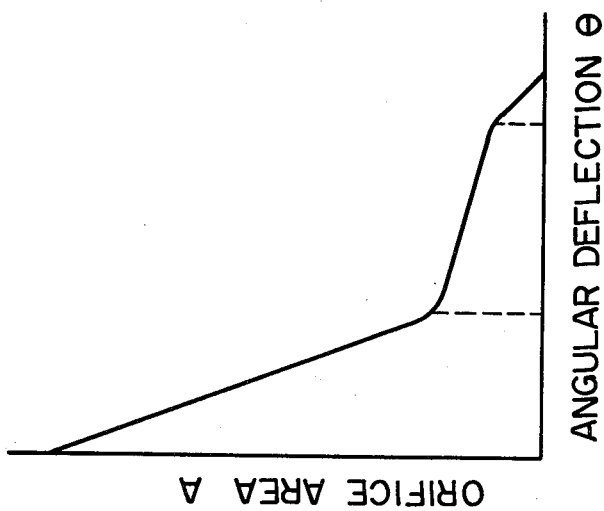
FIG. 6 is a graph showing the relation between the angular deflection of the rotor relative to the valve sleeve and the orifice area.

Each of the lands 35 on the rotor 22 is formed at each of its circumferentially opposite edges with a chamfer 43 of a shape best seen in FIG. 4. That is, at each of the opposite edges, there are formed first and second slopes 47 and 48 having relatively different angles. The second slope 48 has a larger angle than does the first slope 47 with respect to the circumferential direction of each land 35. A third slope 49, whose angle is more gentle than that of the first slope 47, is further formed between the circumferential circular portion of each land 35 and the second slope 48. The opening area at each of the orifices 45 and 46 which is established between one of the rotor lands 35 and one of two adjacent sleeve lands 28 cooperable therewith is abruptly decreased as the rotor 22 is rotated relative to the sleeve 21 through an angular extent between positions X0 and X1. As the rotor 22 is further relatively rotated through an angular extent between positions X1 and X2, the first slope 47 effectively acts to smoothly reduce the rate of decrease of the opening area at each of the orifices 45 and 46. During the subsequent rotation of the rotor 22 through an angular extent between positions X2 and X3, the second slope 48 is brought into effect, and this causes the opening area at each of the orifices 45 and 46 to decrease at a larger rate than that induced by the action of the first slope 47. As a result, the opening area at each of the orifices 45 and 46 changes as shown in FIG. 6 as the angular position of the rotor 22 varies. The orifice area curve shown in FIG. 6 provides a two-step (i.e., two transition point) pressure characteristic shown in FIG. 7 which is optimum for a servovalve for a power steering system. As seen in FIG. 7, the pressure applied to the power cylinder 16 is barely increased in the vicinity of the neutral position of the rotor 22, increases linearly in proportion to the relative rotation between the sleeve 21 and the rotor 22 at the intermediate range of the relative rotation thereof, and increases abruptly after the intermediate range.

Figure 5:
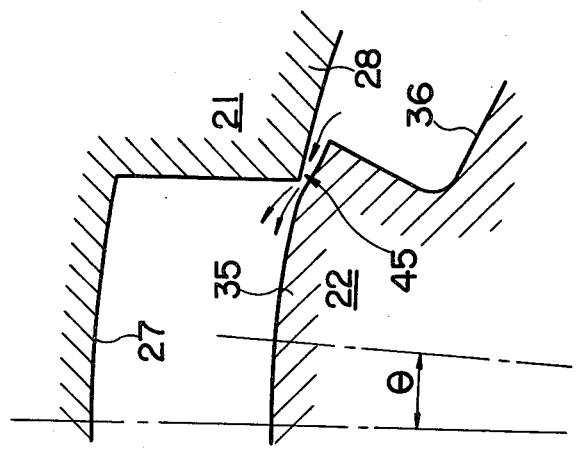
FIG. 5 is the same sectional view as FIG. 4, however illustrating another situation in operation.

As the rotor 22 is subsequently rotated relative to the sleeve 21, the opening area at each of the orifices 45 and 46 is decreased as shown in FIG. 5 to thereby bring about a pressure increase which increases the flow rate of the pressurized fluid passing through each of the orifices 45 and 46. At this time, owing to the provision of a third slope 49 having a gentle slope angle, the pressurized fluid is caused to smoothly flow without separating from the land 35, which advantageously results in restraining the generation of cavitation and hence, in diminishing the orifice noise. It is important to note that the angle of the third slope 49 is important only for promoting smooth flow without separation and has no affection on the two-step pressure characteristics.

Although in the above-described embodiment, the chamfers 43 are formed on the lands 35 of the rotor 22, the same effect as in the above-described embodiment can be obtained in the case where the chamfers 43 are formed at the circumferential edges of the lands 28 on the sleeve 21.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotary servovalve comprising:
   a valve sleeve;
   a rotor positioned in said valve sleeve for rotation relative thereto;
   first, second and third port means provided in said valve sleeve and said rotor, said first, second and third port means communicating with a flow control portion defined by the internal surface of said valve sleeve together with the circumferential surface of said rotor;
   a plurality of first axially extending lands formed on said internal surface of said valve sleeve;
   a plurality a second axially extending lands formed on said circumferentail surface of said rotor and cooperating with said first axially extending lands to establish therebetween a plurality of orifices comprising said flow control portion, wherein said orifices control the flow of fluid from one of said first and second port means to said third port means and from said third port means to the other of said first and second port means; and
   a plurality of chamfers formed on circumferential edges of one of said first and second axially extending lands, each of said chamfers being composed of first, second and third slopes disposed in turn from a circumferential end surface of an associated one of said lands towards an inland of said associated one of said lands;
   said first slope having a first angle with respect to the circumferential direction of said associated one of said lands,
   said second slope having a second angle larger than said first angle with respect to the circumferential direction of said associated one of said lands, and
   said third slope having a third angle smaller than said first angle with respect to the circumferential direction of said associated one of said lands for smoothly connecting said second slope with a circumferential surface of said associated one of said lands.

2. A rotary servovalve as set forth in claim 1, wherein said plurality of said first axially extending lands are identical with one another in shape and size; and
   said plurality of said second axially extending lands are identical with one another in shape and size.

3. A rotary servovalve as set forth in claim 3, wherein:
   said first and third port means are provided in said valve sleeve while said second port means is provided in said rotor.

4. A rotary servovalve as set forth in claim 4, wherein said first port means comprises at least one supply port;
   said third port means comprises at least one pair of distribution ports disposed on either side of said at least one supply port in the circumferential direction of said rotor so as to communicate with said at least one supply port through two of said plurality of orifices; and
   said second port means comprises at least one pair of exhaust ports disposed on the sides of said at least one pair of said distribution ports opposite said at least one supply port in the circumferential direction of said rotor so as to communicate with said at least one pair of said distribution ports through two others of said plurality of orifices.

5. A rotary servovalve as set forth in claim 4, further comprising:
   a valve housing rotatably receiving said valve sleeve; and
   a torsion bar connecting said rotor with said valve sleeve for permitting relative rotation therebetween only within a limited angular extent and rotating said valve sleeve together with said rotor when said valve sleeve is rotated beyond said limited angular extent.

6. A rotary servovalve as set forth in claim 3, wherein said first port means comprises four supply ports;
   said third port means comprises four pairs of distribution ports, each of said pairs being disposed on either side of an associated one of said four supply ports and communicating through two of said plurality of said orifices; and
   said second port means comprises four exhaust ports each communicating through two others of said plurality of orifices with two associated distribution ports which are between two of said supply ports adjoining in the circumferential direction of said rotor.

7. A rotary servovalve as set forth in claim 6, further comprising:
   a valve housing rotatably receiving said valve sleeve; and
   a torsion bar connecting said rotor with said valve sleeve for permitting relative rotation therebetween only within a limited angular extent and rotating said valve sleeve together with said rotor when said valve sleeve is rotated beyond said angular extent.

* * * * *